United States Patent
Itawaki et al.

(10) Patent No.: US 7,130,310 B2
(45) Date of Patent: Oct. 31, 2006

(54) STATISTICAL MULTIPLEX SYSTEM, STATISTICAL MULTIPLEX CONTROLLER AND METHOD OF STATISTICAL MULTIPLEX

(75) Inventors: Motofumi Itawaki, Kanagawa (JP); Satoshi Miyazawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 985 days.

(21) Appl. No.: 09/931,365

(22) Filed: Aug. 16, 2001

(65) Prior Publication Data
US 2002/0085584 A1    Jul. 4, 2002

(30) Foreign Application Priority Data
Aug. 17, 2000  (JP) .............................. 2000-247845

(51) Int. Cl.
H04J 3/16    (2006.01)
H04J 3/02    (2006.01)

(52) U.S. Cl. ...................................... 370/465; 370/538

(58) Field of Classification Search ................ 370/230, 370/232, 235, 401, 412, 414, 419, 465, 468, 370/477, 537, 538
See application file for complete search history.

(56) References Cited

U.S. PATENT DOCUMENTS

| | | | | |
|---|---|---|---|---|
| 5,506,844 A | * | 4/1996 | Rao | 370/468 |
| 6,055,270 A | * | 4/2000 | Ozkan et al. | 375/240.03 |
| 6,078,958 A | * | 6/2000 | Echeita et al. | 709/226 |
| 6,167,084 A | * | 12/2000 | Wang et al. | 375/240.02 |
| 6,594,271 B1 | * | 7/2003 | Wu et al. | 370/412 |

* cited by examiner

Primary Examiner—Huy D. Vu
Assistant Examiner—Daniel Ryman
(74) Attorney, Agent, or Firm—Frommer Lawrence & Haug LLP; William S. Frommer; Paul A. Levy (57) ABSTRACT

Disclosed are a statistical multiplex system, a statistical multiplex controller and a method of statistical multiplex, which can assign bit rates to program data and auxiliary data efficiently, and also improve image quality. A statistical multiplex system is provided with: a plurality of image encoders for encoding a plurality of program data; an information encoder for encoding the auxiliary data; a multiplexing apparatus for multiplexing output thereof, and a statistical multiplex controller for controlling each of the image encoders and the information encoder. The statistical multiplex controller is made to set the bit rate to be assigned to the information encoder first, and to assign the remaining bit rates to each of the image encoders.

12 Claims, 9 Drawing Sheets

STATISTICAL MULTIPLEX SYSTEM, STATISTICAL MULTIPLEX CONTROLLER AND METHOD OF STATISTICAL MULTIPLEX

BACKGROUND OF THE INVENTION

1. Field of the Invention

The present invention relates to a statistical multiplex system for encoding and multiplexing a plurality of program data which includes image data and auxiliary data other than the program data, and a statistical multiplex controller and a method of statistical multiplex that are used in the statistical multiplex system.

2. Description of the Related Art

Recently, digital broadcast for transmitting and receiving image data and the like as digital data has been attracted attention. It is an advantage of the digital broadcast that more program data (hereinafter, referred to as program) can be transmitted as compared with analog broadcast in the case that the same transmission channel is used. The reason for this greatly depends on a fact that image data can be transmitted with compression. As a method for compressing image data, for example, a bidirectional predictive encoding method that is adopted in an MPEG (Moving Picture Experts Group) standard has been employed.

When compressively encoding images for the digital broadcast, high image quality must be maintained while an amount of compressively encoded data (a quantity of bits) is suppressed to at most a transmission capacity of the transmission channel.

A technique called "statistical multiplexing" may be employed to transmit more programs to a transmission channel having a predetermined transmission capacity. The statistical multiplexing technique is a technique in which a code rate to be assigned to each program is dynamically changed so as to transmit more programs. In the statistical multiplexing technique, for example, by means of reducing the code rate with respect to the program in which deterioration of image quality is not noticeable even if the code rate thereof is reduced, it becomes possible to transmit more programs.

Figure 1:
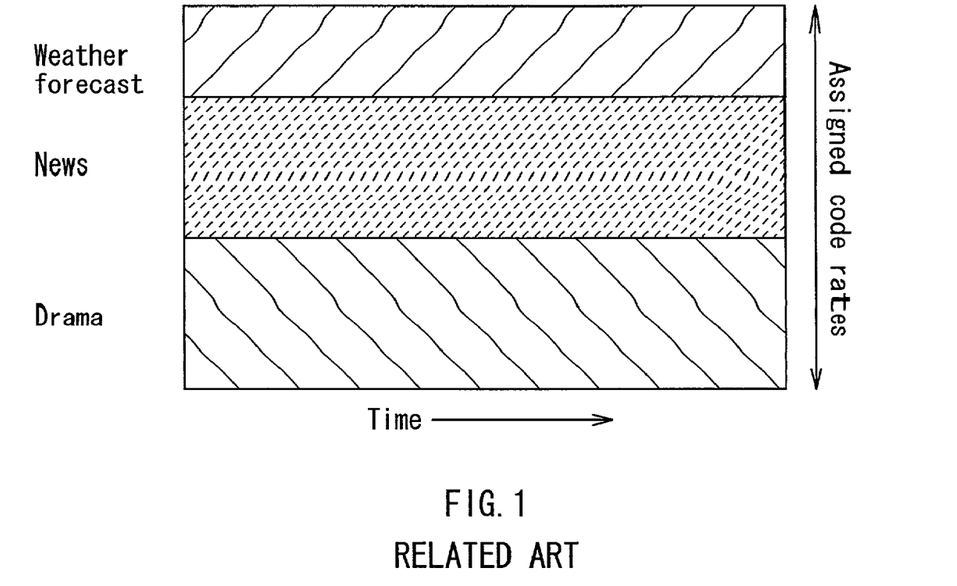
FIG. 1 is a diagram showing general assigned code rates in the case where bit rates are fixed.
Figure 2:
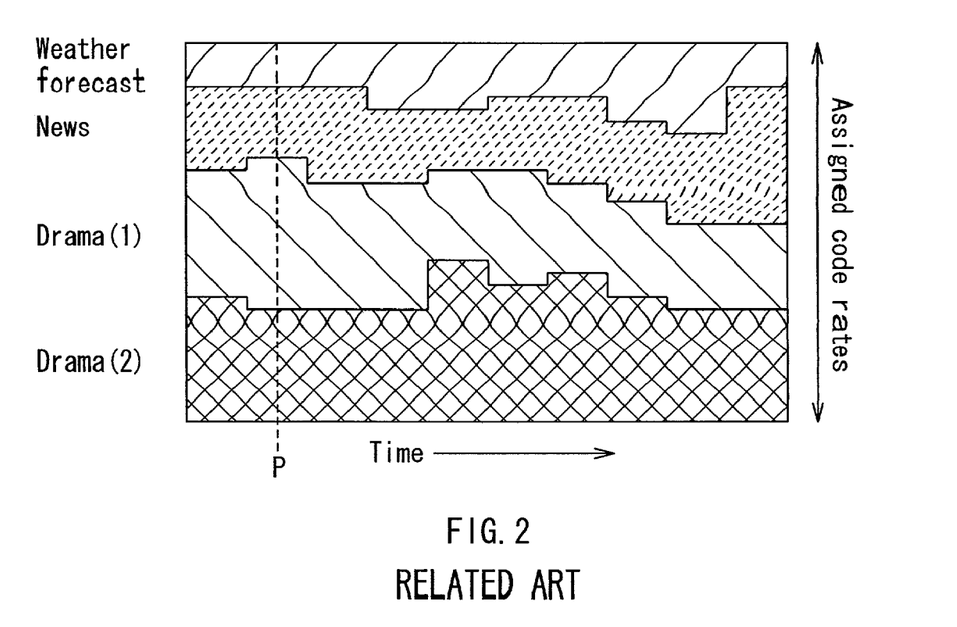
FIG. 2 is a diagram showing general assigned code rates under a statistical multiplexing control.

Referring to FIGS. 1 and 2, the statistical multiplexing control will be further described. FIG. 1 shows an example of assigned code rates to respective programs when the programs are multiplexed by conventional fixed rates. In FIG. 1, the vertical axis indicates the assigned code rates to the respective programs, while the horizontal axis indicates time. As shown in FIG. 1, the assigned code rates to the respective programs, such as a weather forecast, news and drama, which are to be multiplexed, are kept at code rates assigned as initial values, which have not been changed in accordance with time passing. The code rates which are assigned to the respective programs as the initial values are assigned so that deteriorations of image quality in portions (time) of the respective programs whose deteriorations of image quality are conspicuous are within allowable ranges. As a result, excessively high code rates are assigned to portions except for the potions in which the deteriorations of image quality are conspicuous.

FIG. 2 shows an example of assigned code rates to respective programs when the code rates assigned to the respective programs are dynamically changed and multiplexed by using the statistical multiplexing technique. The vertical axis indicates code rates assigned to the respective programs, while the horizontal axis indicates time. The statistical multiplexing technique uses the fact that portions (time) of the respective programs whose deteriorations of image quality are conspicuous unusually occur simultaneously. Since there are many cases where portions of a program whose deteriorations of image quality are conspicuous correspond to portions of the other programs whose deterioration of image quality is inconspicuous even if the code rates thereof are reduced, a great code rate can be assigned to the program whose deterioration of image quality is conspicuous by reducing the code rates of the other programs. In an example shown in FIG. 2, when a portion of drama (1) is conspicuous in deterioration of image quality and portions of news and drama (2) are inconspicuous in deterioration of image quality at time P, the code rates of the news and the drama (2) are reduced so as to assign the drama (1) additionally with the code rate corresponding to the code rates. Thus, employment of the statistical multiplexing technique enables a larger number of programs than usual to be transmitted.

Figure 3:
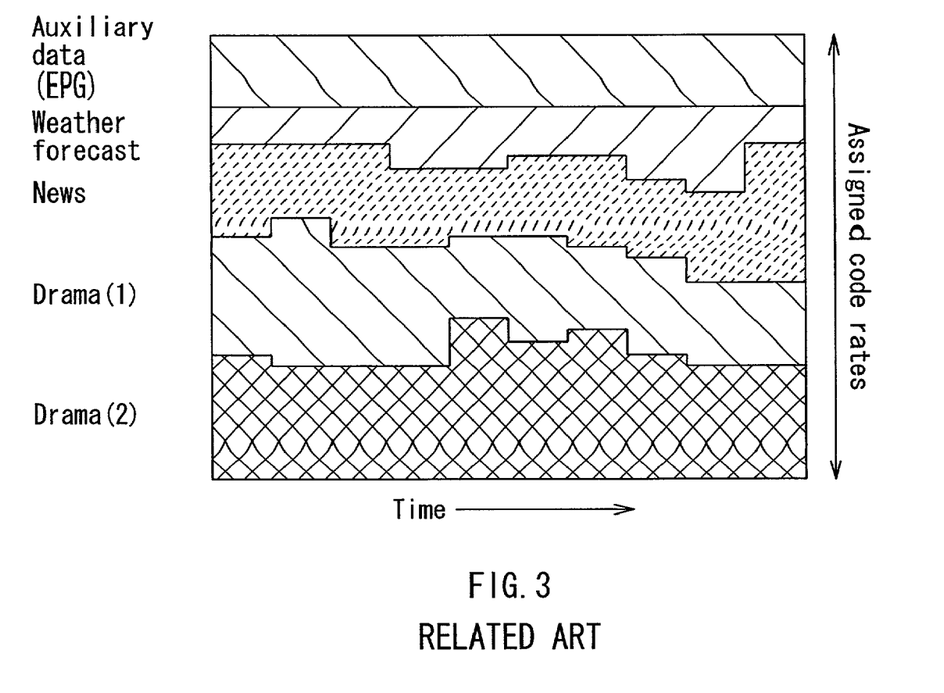
FIG. 3 is a diagram showing general assigned code rates under the statistical multiplexing control.

Here, in recent years, it is considered to transmit auxiliary data other than programs, including an EPG (Electric Program Guide), together with the programs. FIG. 3 shows an example of assigned code rates in the case where the programs and the auxiliary data are multiplexed to transmit. As shown in FIG. 3, the code rate assigned to each program is variably controlled by the statistical multiplexing technique, while the code rate assigned to the auxiliary data is always fixed.

However, as a result of the code rate assigned to the auxiliary data being fixed in this manner, empty data are transmitted when the amount of the auxiliary data is small, so that there has been a problem that waste is much. Furthermore, even though improvement of image quality can be intended by increasing the code rate assigned to the program data when the amount of the auxiliary data is small, such assignment is not performed conventionally.

SUMMARY OF THE INVENTION

The present invention has been achieved in light of the foregoing problems and its object is to provide a statistical multiplex system, a statistical multiplex controller and a method of statistical multiplex, whereby the assignements of the code rates are performed efficently and the image quality can be improved.

A statistical multiplex system according to the present invention is provided with: a plurality of image encoding means for encoding a plurality of program data, each of which includes image data, and outputting the resultant; at least one information encoding means for encoding auxiliary data other than the program data, and outputting the resultant; multiplex means for multiplexing output data of each of the image encoding means and the information encoding means; and statistical multiplex control means for setting a code rate for the information encoding means, the code rate representing an amount of codes to be outputted per unit time, acquiring an encoding difficulty level which indicates a level of difficulty in encoding for each program data, and assigning code rates to each of the image encoding means on the basis of the code rate for the information encoding means-and the encoding.

A statistical multiplex controller according to the present invention is a statistical multiplex controller for controlling each of the image encoding means and the information encoding means, and for use in the statistical multiplex system which is provided with a plurality of image encoding means for encoding a plurality of program data, each of which includes image data, and outputting the resultant; at least one information encoding means for encoding auxiliary data other than the program data and outputting the resultant; and multiplex means for multiplexing output data of each of the image encoding means and the information encoding means, the statistical multiplex controller comprising; means for setting a code rate for the information encoding means, the code rate representing an amount of codes to be outputted per unit time; means for acquiring an encoding difficulty level which indicates a level of difficulty in encoding for each program data; and means for assigning code rates to each of the image encoding means on the basis of the code rate for the information encoding means and the encoding difficulty level.

A method of statistical multiplex according to the present invention is a method of statistical multiplex for controlling each of the image encoding means and the information encoding means, and for use in the statistical multiplex system which is provided with: a plurality of image encoding means for encoding a plurality of program data, each of which includes image data, and outputting the resultant; at least one information encoding means for encoding auxiliary data other than the program data, and outputting the resultant; and multiplex means for multiplexing output data of each of the image encoding means and the information encoding means, the method comprising steps of setting a code rate for the information encoding means, the code rate representing an amount of codes to be outputted per unit time; acquiring an encoding difficulty level which indicates a level of difficulty in encoding for each program data; and assigning code rates to each of the image encoding means on the basis of the code rate for the information encoding means and the encoding difficulty level.

In the statistical multiplex system, the statistical multiplex controller and the method of statistical multiplex according to the present invention, first of all, priority is given to setting the code rate for the information encoding means, and the code rates to be assigned to each of the image encoding means is set on the basis of the said code rate.

Other and further objects, features and advantages of the invention will appear more fully from the following description.

DETAILED DESCRIPTION OF THE PREFERRED EMBODIMENTS

Below, an embodiment of the present invention will be described in detail with reference to the drawings.

Figure 4:
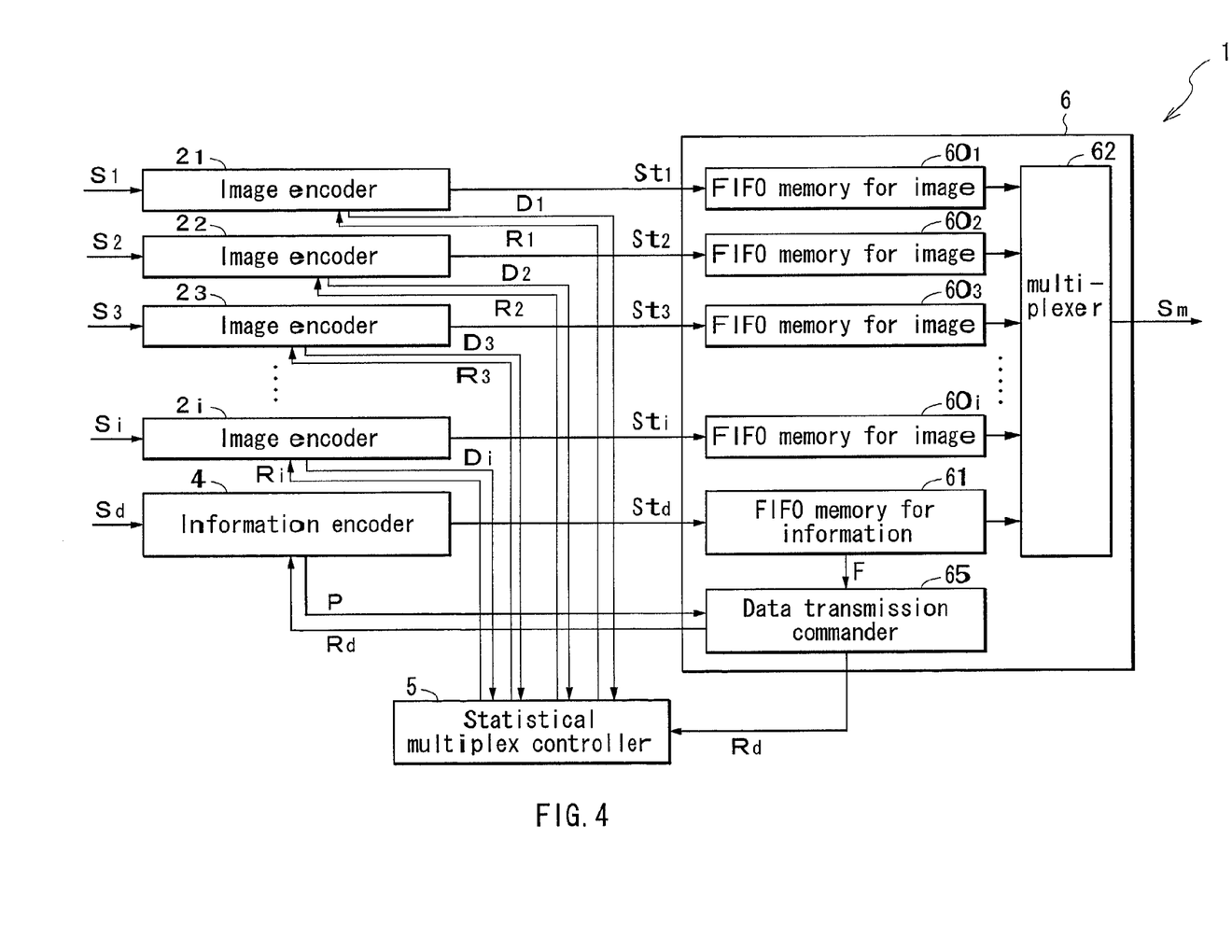
FIG. 4 is a block diagram showing a schematic structure of a statistical multiplex system including a statistical multiplex controller according to an embodiment of the present invention.

FIG. 4 is a block diagram showing an example of a structure of a statistical multiplex system according to an embodiment of the present invention. The statistical multiplex system 1 is provided with image encoders $2i$ as a plurality of image encoding means to compressively encode programs Si ('i' is an integer not smaller than 1) as program data, an information encoder 4 as the information encoding means to encode information Sd other than the programs, a multiplexing apparatus 6 for multiplexing output data of each of the image encoders $2i$ and the information encoder 4 to output the multiplexed data to a transmission channel. Furthermore, the statistical multiplex system 1 is provided with a statistical multiplex controller 5 to control each of the image encoders $2i$ and the information encoder 4 by assigning bit rates (code rates) to each of the image encoders $2i$ and the information encoder 4 as a quantity of codes to be outputted per unit time.

To the image encoders $2i$, the programs Si are inputted, each of which includes image data. The image encoders $2i$ are set to compressively encode the programs Si and output the encoded to the multiplexing apparatus 6 as encoded image signals Sti. Each of the image encoders $2i$ is set to be able to change, frame by frame, the bit rates Ri as a quantity of codes of the encoded image signals Sti to be outputted per unit time. Furthermore, the image encoders $2i$ are set to calculate encoding difficulties Di (that is, rates of required amount of data for maintaining the equal image quality) of the inputted programs Si and to send the encoding difficulties Di to the statistical multiplex controller 5.

To the information encoder 4, auxiliary data Sd that includes the EPG and the Internet information is inputted, which is not synchronized with the programs Si. The information encoder 4 is set to encode the auxiliary data Sd and output the encoded to the multiplexing apparatus 6 as an encoded information signal Std. Moreover, the information encoder 4 is set to calculate a target value P of the bit rate of the encoded information signal Std to output on its own, in accordance with an amount of information of the auxiliary data Sd, on the auxiliary data Sd being inputted, and to send the target value P to a data transmission commander 65, which will be described later.

A multiplexing apparatus 6 is provided with FIFO (first-in, first-out) memories $60i$ for image that delay the encoded image signals Sti outputted from each of the image encoders $2i$ by a predetermined time interval so as to output each signal in the order of inputting, and an FIFO memory 61 for information that delays the encoded information signal Std outputted from the information encoder 4 by a predetermined time interval so as to output the signal in the order of inputting. Furthermore, the multiplexing apparatus 6 is provided with a multiplexer 62 as multiplexing means for multiplexing the encoded image signals Sti and the encoded information signal Std that are outputted from the FIFO memories $60i$ for image and the FIFO memory 61 for information. The multiplexer 62 is set to watch sequentially whether data are maintained in the FIFO memories $60i$ for image and the FIFO memory 61 for information or not, so as to immediately draw out all data as soon as it is recognized that data are maintained in any memory. Moreover, the FIFO memory 61 for information is set to transmit, to the data transmission commander 65, information (hereinafter, referred to as data remaining condition F) about space taken up by data in all its storing capacity.

The multiplexing apparatus 6 is further provided with the data transmission commander 65 for controlling output of the information encoder 4. The data transmission commander 65 receives the target value P of the bit rate transmitted from the information encoder 4, and further receives the data remaining condition F transmitted from the FIFO memory 61 for information. The data transmission commander 65, furthermore, on the basis of the target value P of the bit rate and the data remaining condition F, is set to determine the bit rate Rd of the encoded information signal Std to be outputted by the information encoder 4, so as to transmit the bit rate Rd to the information encoder 4.

Incidentally, the reason why the data transmission commander 65 is set to control the output of the information encoder 4 is as follows. That is, there is a possibility that following data are inputted from the information encoder 4 while data still remain in the FIFO memory 61 for information (that is, before the FIFO memory 61 for information becomes "empty"), even though the data inputted to the FIFO memory 61 for information are, as a general rule, drawn out immediately and entirely by the multiplexer 62. Such being the case, the data transmission commander 65 is set to determine the bit rate Rd to be assigned to the information encoder 4 on the basis of the target value P of the bit rate transmitted from the information encoder 4 and the data remaining condition F of the FIFO memory 61 for information, in order not to cause overflow at the FIFO memory 61 for information and in order for the bit rate of the output data from the multiplexer 62 not to exceed the transmitting capacity.

Figure 5:
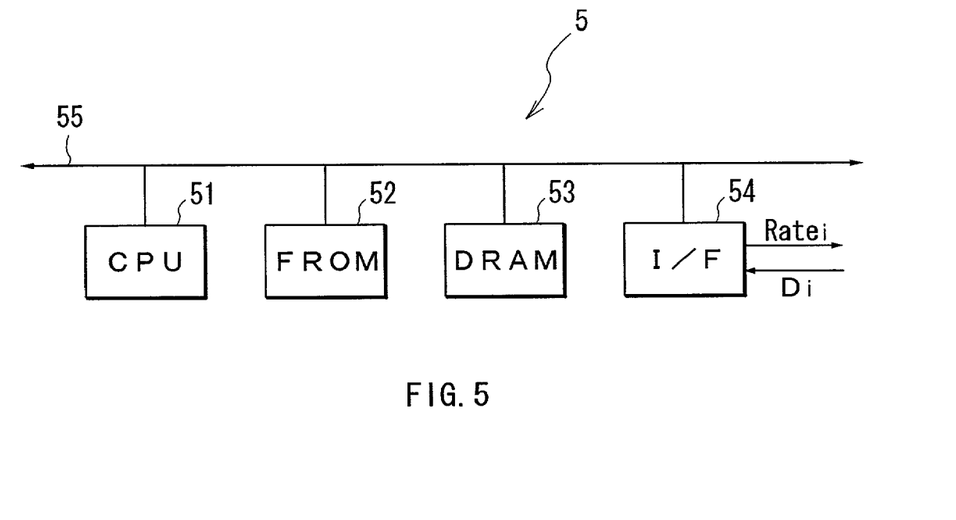
FIG. 5 is a block diagram showing a structure of the hardware of the statistical multiplex controller in the statistical multiplex system shown in FIG. 4.

FIG. 5 is a block diagram showing an example of a schematic structure of the statistical multiplex controller 5 shown in FIG. 4. The statistical multiplex controller 5 is provided with CPU (Central Processing Unit) 51, FROM (flash electrically erasable programmable read only memory) 52, DRAM (dynamic random access memory) 53, and a bus 55 to which the foregoing elements are connected. The statistical multiplex controller 5 is further provided with an interface 54 for performing transmission and reception of data with each of the image encoders 2$i$ and the information encoder 4. The statistical multiplex controller 5 is set to receive the bit rate Rd of the encoded information signal Std from the data transmission commander 65, and to receive the encoding difficulties D$i$ from each of the image encoders 2$i$, via the interface 54. In addition, the statistical multiplex controller 5 is set to transmit the bit rates Ri of the encoded image signals Sti to each of the image encoders 2$i$.

Figure 6:
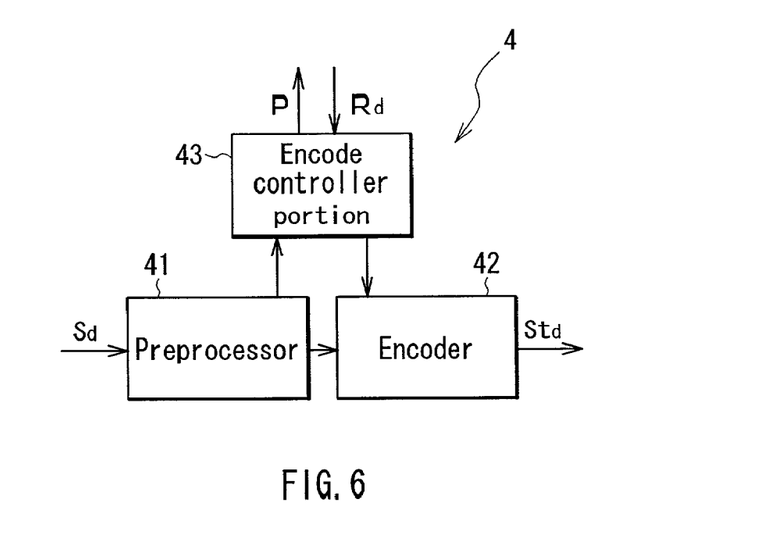
FIG. 6 is a block diagram showing an example of a schematic structure of an information encoder in the statistical multiplex system shown in FIG. 4.

FIG. 6 is a block diagram showing an example of a schematic structure of the information encoder 4. The information encoder 4 is provided with a preprocessor 41 for the auxiliary data Sd being inputted to and performing a predetermined preprocessing, an encoder 42 for encoding output data of the preprocessor 41 to output the encoded data as the encoded information signal Std, and an encode controller 43 for controlling the encoding process in the encoder 42. In the preprocessor 41, the data indicating the amount of information of the inputted auxiliary data Sd is outputted to the encode controller 43. In the encode controller 43, the target value P of the bit rate of the encoded information signal Std to be outputted from the encoder 42 is calculated on the basis of the amount data of information that is inputted from the preprocessor 41, so as to be transmitted to the statistical multiplex controller 5. Furthermore, the encode controller 43 is set to receive the bit rate Rd that is sent from the statistical multiplex controller 5, so as to control the output of the encoder 42 on the basis of the bit rate Rd.

Figure 7:
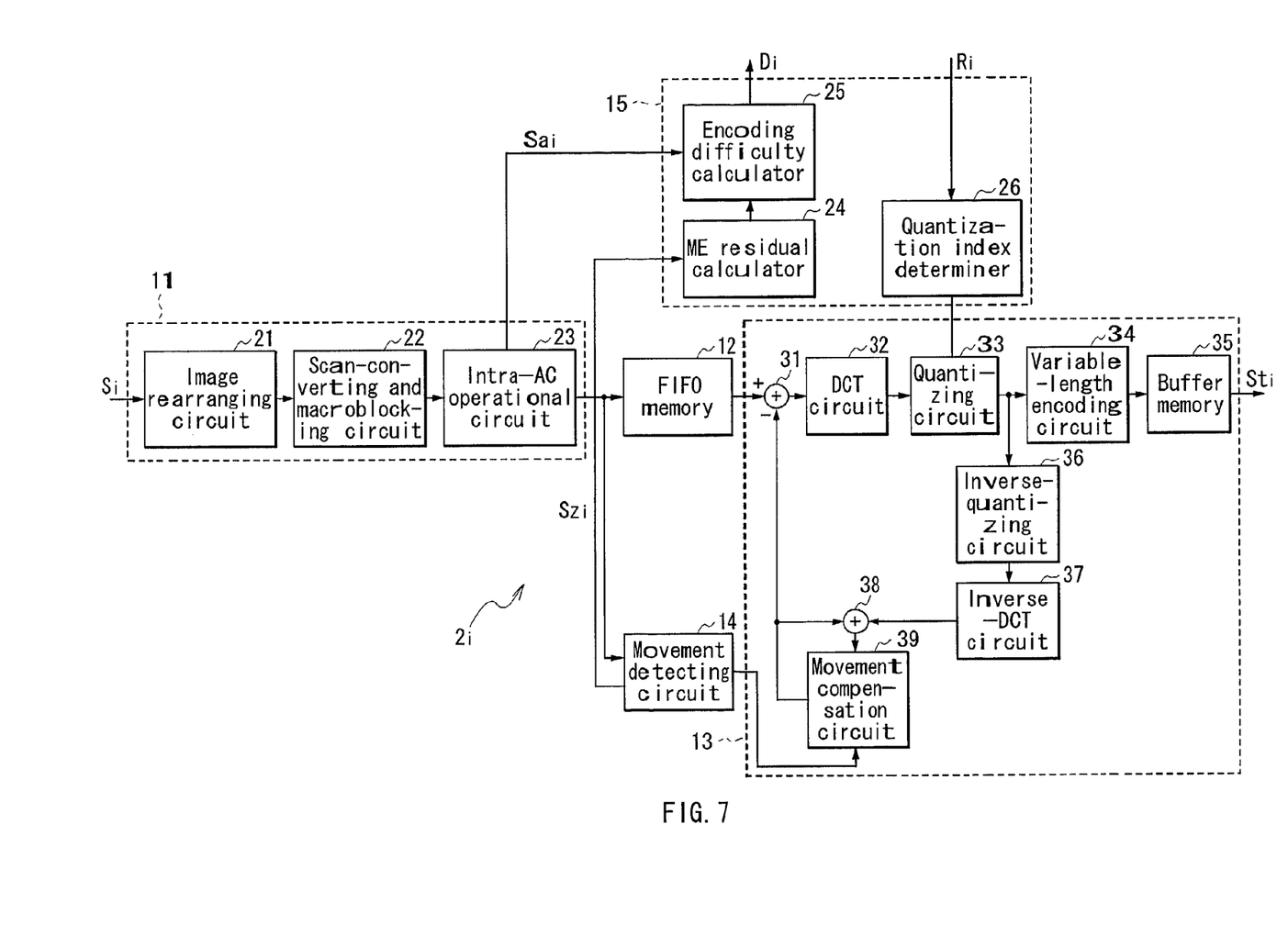
FIG. 7 is a block diagram showing an example of a schematic structure of an image encoder in the statistical multiplex system shown in FIG. 4.

FIG. 7 is a block diagram showing a detailed structure of the image encoder 2$i$. The image encoder 2$i$ is provided with: a preprocessor 11 precedent to an encoder for the programs Si being inputted to and performing preprocessing and the like for encoding with compression; an FIFO memory 12 for outputting output data of the preprocessor 11 precedent to the encoder by delaying for predetermined time; an encoder 13 for inputting output data of the FIFO memory 12 to compressively encode the output data by an image encoding method corresponding to a picture type for every picture so as to output the encoded image signals Sti; a movement detecting circuit 14 for detecting a movement vector in accordance with output data of the preprocessor 11 precedent to the encoder so as to transmit the movement vector to the encoder 13; and an encode controller 15 for controlling the encoder 13 based upon intra-AC data Sai outputted from the preprocessor 11 precedent to the encoder and ME residual data Szi outputted from the movement detecting circuit 14. Note that the ME residual is the sum of absolute values or the sum of squares of movement predictive errors for the overall picture. The ME residual data Szi is data for obtaining the ME residual.

The preprocessor 11 precedent to the encoder is provided with; an image rearranging circuit 21 for the programs Si being inputted to and rearranging the order of pictures (I pictures, P pictures and B pictures) in accordance with the order of encoding; a scan-converting and macroblocking circuit 22 for output data of the image rearranging circuit 21 being inputted to, determining whether the inputted data has a frame structure or a field structure, and performing scan-conversion in accordance with the result of the determination and macroblocking composed of 16 by 16 pixels; and an intra-AC operational circuit 23 for output data of the scan-converting and macroblocking circuit 22 being inputted to, calculating an intra-AC in the I picture so as to transmit the intra-AC data Sai to the encode controller 15 and so as to transmit the output data of the scan-converting and macroblocking circuit 22 to the FIFO memory 12 and the movement detecting circuit 14. The intra-AC is, in the I picture, defined as the sum of absolute values of differences between pixel values of each pixel in 8- by 8-pixel DCT (discrete cosine transformation) blocks and an average value of pixel values in the DCT blocks. It can be said that the intra-AC indicates the complexity of the picture.

The encoder 13 is provided with: a subtraction circuit 31 for obtaining the difference between the output data of the FIFO memory 12 and the predictive image data; a DCT circuit 32 for performing DCT for the output data of the subtraction circuit 31 in DCT block units so as to output a DCT coefficient; a quantizing circuit 33 for quantizing the output data of the DCT circuit 32; a variable-length encoding circuit 34 for variable-length encoding the output data of the quantizing circuit 33; a buffer memory 35 for temporarily storing the output data of the variable-length encoding circuit 34 so as to output the data as the encoded image signals Sti composed of bit streams; an inverse-quantizing circuit 36 for inversely quantizing the output data of the quantizing circuit 33; an inverse-DCT circuit 37 for performing inverse DCT for output data of the inverse-quantizing circuit 36; an addition circuit 38 for adding the output data of the inverse-DCT circuit 37 and the predictive image data so as to output; and a movement compensation circuit 39 for storing the output data of the addition circuit 38 to perform movement compensation in accordance with the movement vector transmitted from the movement detecting circuit 14 so as to output the predictive image data to the subtraction circuit 21 and the addition circuit 38.

The movement detecting circuit 14 searches for an interest macroblock in a picture which should be an object to be compressively encoded and a macroblock of which the sum of absolute values or the sum of squares of the difference of the pixel value from the interest macroblock in the picture to be referred to becomes minimum based upon the output data of the preprocessor 11 precedent to the encoder, so as to detect the movement vector and transmit the same to the movement compensation circuit 39. On the other hand, when obtaining the movement vector, the movement detecting circuit 14 transmits the sum of absolute values or the sum of squares of the differences of the pixel values between macroblocks in which the difference has become minimum, as the ME residual data Szi to the encode controller 15.

The encode controller 15 is provided with: an ME residual calculator 24 for calculating the ME residual which is a value of addition of the ME residual data Szi from the movement detecting circuit 14 throughout the picture; and an encoding difficulty calculator 25 for calculating the encoding difficulty Di, which indicates the encoding difficulty in encoding the picture, based upon the ME residual calculated by the ME residual calculator 24 and the intra-AC data Sai from the intra-AC operational circuit 23, so as to transmit the encoding difficulty Di to the statistical multiplex controller 5. Moreover, the encode controller 15 is provided with a quantization index determiner 26 for determining a quantization index corresponding to a quantization characteristic value in the quantizing circuit 33 in such a manner to be a bit rate Ri which is determined by the statistical multiplex controller 5 based upon the encoding difficulty Di calculated by the encoding difficulty calculator 25 so as to transmit the quantization index to the quantizing circuit 33.

Now, the encoding difficulty will be described. The encoding difficulty indicates difficulty in encoding the picture, which can be translated into a ratio of a quantity of data required to maintain the same image quality. A variety of methods may be employed to express the encoding difficulty numerically. In the present embodiment, the encoding difficulty is obtained through the use of the intra-AC as for the I picture, and the encoding difficulty is obtained through the use of the ME residual as for the P picture and the B picture. As described above, the intra-AC indicates the complexity of the picture, and the ME residual indicates the velocity of movement of video and the complexity of the picture. Since the above-mentioned factors have a strong correlation with the difficulty in encoding, the encoding difficulty can be calculated by using, for example, a linear function having the foregoing factors as variables.

Figure 8:
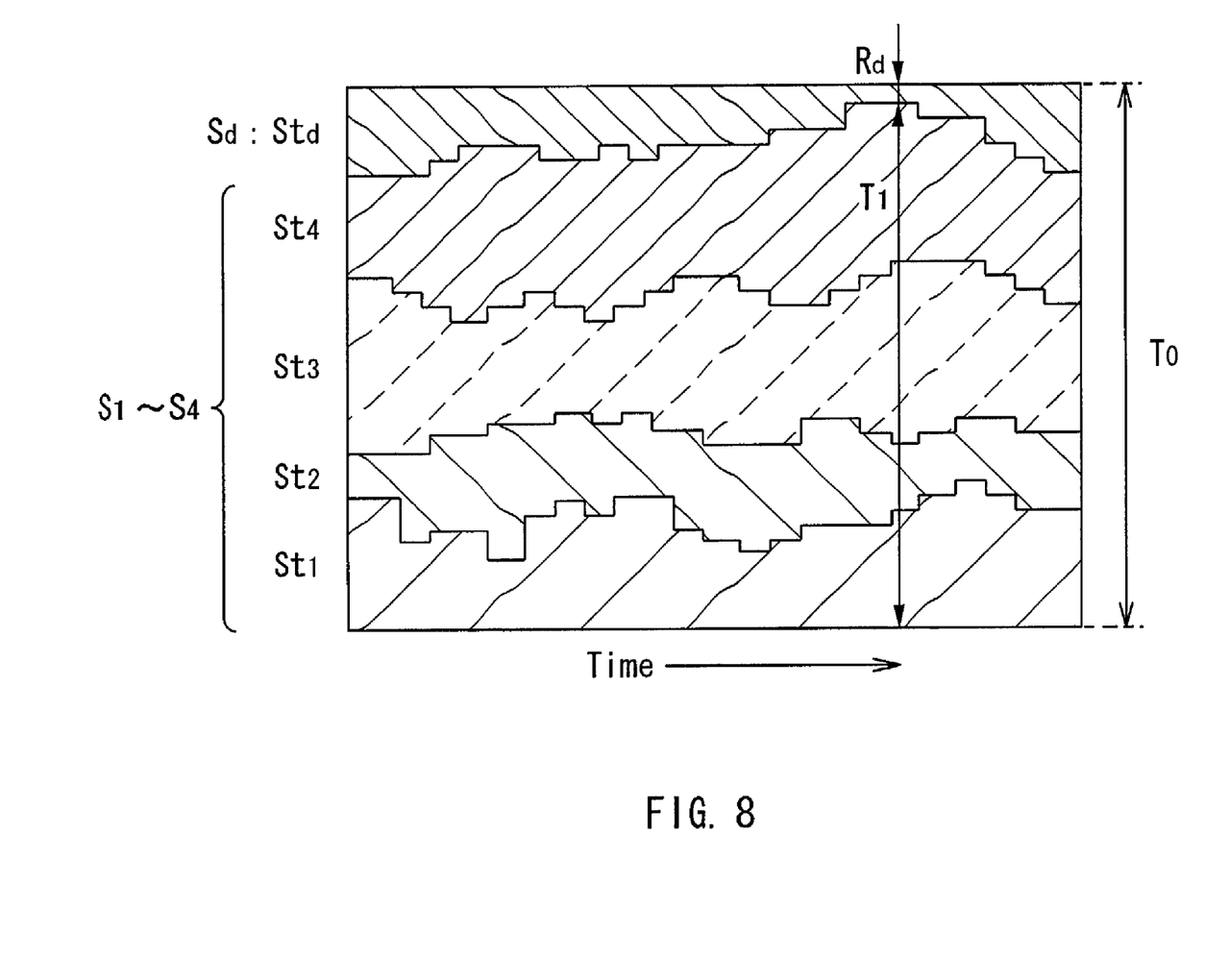
FIG. 8 is a chart showing an example of assigned bit rates in the statistical multiplex controller shown in FIG. 4.

Next, the basic operation of the statistical multiplex system 1 shown in FIG. 4 will be described. FIG. 8 is an illustration showing bit rates assigned to the encoded information signal Std and each of the encoded image signals Sti in the statistical multiplex system 1 shown in FIG. 4. In FIG. 8, the vertical axis indicates the bit rates assigned to each of the programs Si and the auxiliary data Sd and the horizontal axis indicates time. Incidentally, in FIG. 8, for the sake of simplicity, only four types are shown as the programs Si.

In the present embodiment, the bit rate Rd to be assigned to the encoded information signal Std is determined first, and the assignment to the encoded image signals ST1 to ST4 is performed within the range of remaining bit rate T1 according to the statistical multiplexing technique. To be concrete, the data transmission commander 65, first of all, determines the bit rate Rd to be assigned to the encoded information signal Std based upon the target value P of the bit rate and the data remaining condition F of the FIFO memory 61 for information which are mentioned above. Subsequently, the statistical multiplex controller 5 performs subtraction of the bit rate Rd assigned to the encoded information signal Std from the gross bit rates (transmitting capacity) TO that can be transmitted. Setting the remainder of the subtraction (TO−Rd) as a reference value T1 for image, the statistical multiplex controller 5 performs the assignment of the bit rates Ri to each of the encoded image signals ST1 to ST4 within the range of the reference value T1 for image according to the statistical multiplexing technique. Hereinafter, the operation of the statistical multiplex system 1 will be described in detail.

The auxiliary data Sd including the EPG is inputted into the information encoder 4, and each of the programs Si is inputted into each of the image encoders 2i. In the information encoder 4, the target value P of the bit rate is set based upon the auxiliary data that is inputted, so that the information encoder 4 transmits the target value P to the data transmission commander 65. On the other hand, in the image encoder 2i, the encode controller 15 calculates the encoding difficulty Di based upon the program Si that is inputted, so that the image encoder 2i transmits the encoding difficulty Di to the statistical multiplex controller 5.

Figure 9:
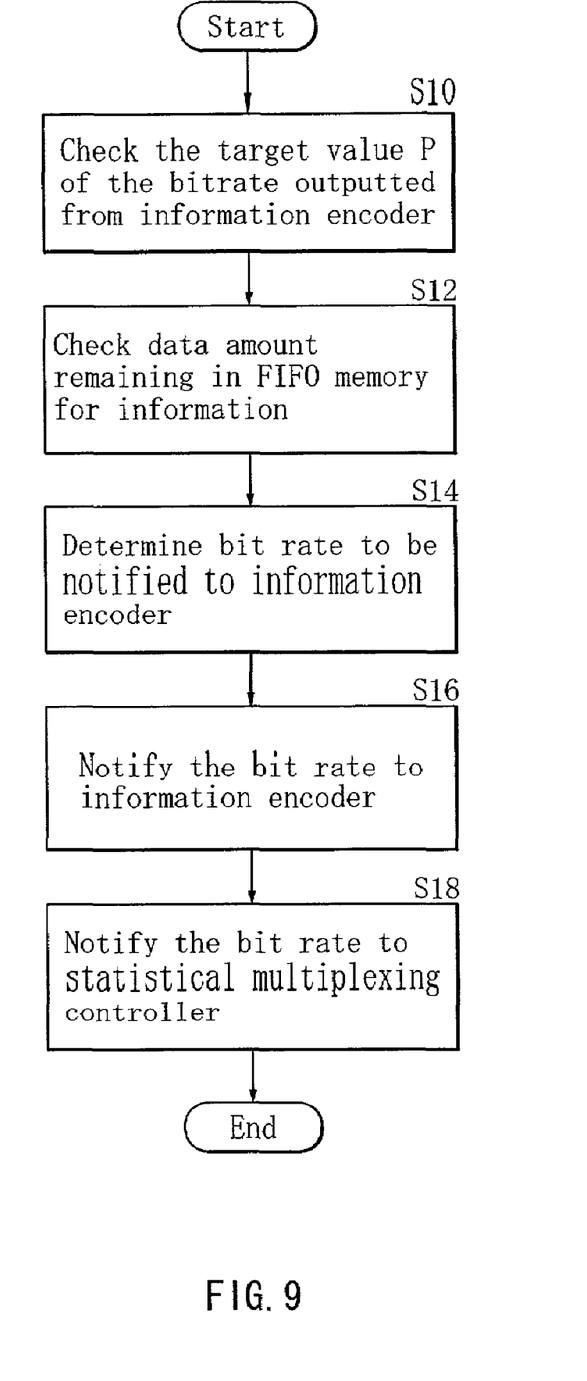
FIG. 9 is a flow chart showing the processing which is carried out by a data transmission commander.

FIG. 9 is a flow chart showing the processing which the data transmission commander 65 carries out. First of all, the data transmission commander 65 checks the target value P of the bit rate that is outputted from the information encoder 4 (step S10), and subsequently checks the data remaining condition F of the FIFO memory 61 for information (step S12). After that, based upon the target value P of the bit rate transmitted from the information encoder 4 and the data remaining condition F of the FIFO memory 61 for information, the data transmission commander 65 determines the bit rate Rd of the encoded information signal Std to be outputted by the information encoder 4 (step S14) in order not to cause the overflow or the like of the FIFO memory 61 for information, and notifies the information encoder 4 of the bit rate Rd (step S16). Subsequently, the data transmission commander 65 notifies the statistical multiplex controller 5 of the bit rate Rd of the encoded information signal Std (step S18). Through the processing shown in FIG. 9, the bit rate Rd of the encoded information signal Std of the information encoder 4 is set.

Figure 10:
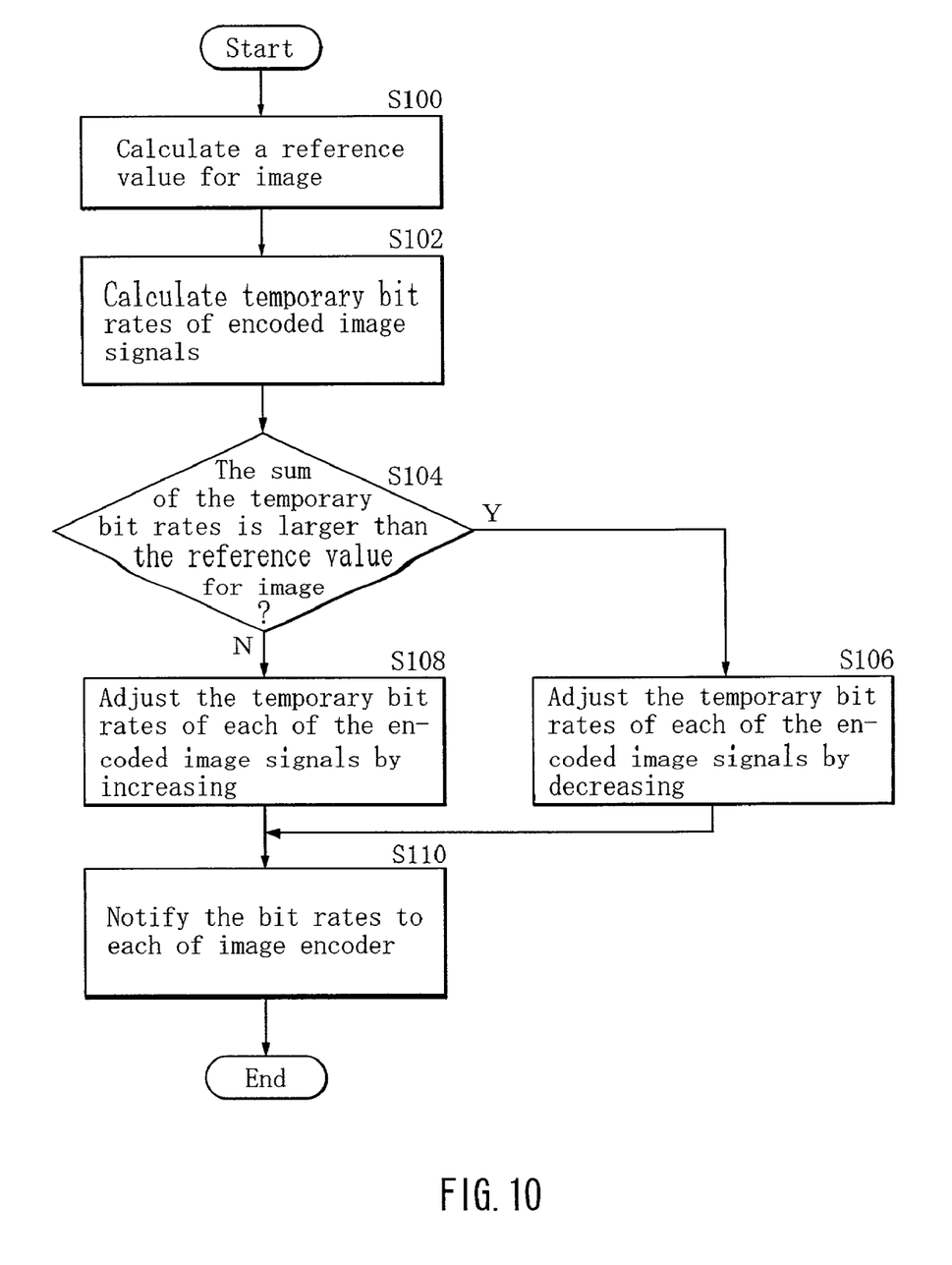
FIG. 10 is a flow chart showing the processing which is carried out by the statistical multiplex controller.

FIG. 10 is a flow chart showing the processing which the statistical multiplex controller 5 carries out. The statistical multiplex controller 5, to begin with, sets the remainder after subtracting the bit rate Rd of the encoded information signal Std that is transmitted from the data transmission commander 65 from the transmitting capacity TO as the reference value T1 for image (step S100). Subsequently, by using the statistical multiplexing technique, based upon the encoding difficulties Di which are inputted from each of the image encoders 2i, the statistical multiplex controller 5 respectively calculates temporary bit rates TRi as temporary target values of the bit rates to be set for each of the image encoders 2i (step S102). In this case, the temporary bit rates TRi are calculated by using an arithmetic equation that represents a correspondence of the encoding difficulties Di to the temporary bit rates Subsequently, the statistical multiplex controller 5 makes a judgment on whether the sum of the temporary bit rates TRi that are set for each of the image encoders 2i is larger or smaller than the reference value T1 for image (step 104). In a case where the sum of the temporary bit rates TRi is larger than the reference value T1 for image (Y at the step S104), each of the temporary bit rates TRi is revised downward so that the sum thereof becomes smaller than or equal to the reference value T1 for image, so as to be taken as the final bit rates Ri (step S106). On the other hand, in a case where the sum of the temporary bit rates TRi is smaller than or equal to the reference value T1 for image (N at the step S104), the temporary bit rates TRi of the encoded image signals Sti are revised upward so that the sum thereof becomes as large as possible within the range of the reference value T1 for image (more specifically, so that the sum becomes equal to or slightly smaller than the reference value T1 for image), so as to be taken as the final bit rates Ri (step S108). Then, the bit rates Ri of the encoded image signals Sti that are set at the steps S106 or S108 are transmitted to each of the image encoders 2i (step S110). Through the processing shown in FIG. 10, the bit rates Ri of the encoded image signals Sti for each of the image encoders 2i are set.

In the information encoder 4, the encode controller 43 receives the bit rate Rd from the data transmission commander 65, so as to control the encoding process in the encoder 42 according to the bit rate Rd. The encoder 42 encodes the auxiliary data Sd at the bit rate Rd instructed by the encode controller 43, so as to output the encoded information signal Std to the multiplexing apparatus 6. In the image encoder 2i, the encode controller 15 receives the bit rate Ri from the statistical multiplex controller 5, so as to control the encoding process in the encoder 12 according to the bit rate Ri. The encoder 13 compressively encodes the program Si at the bit rate Ri instructed by the encode controller 15, so as to output the encoded image signal Sti to the multiplexing apparatus 6. The multiplexing apparatus 6 generates multiplexed data SM by multiplexing the encoded information signal Std transmitted from the information encoder 4 and the encoded image signals Sti transmitted from each of the image encoders 2i, so as to output the multiplexed data SM to the transmission channel.

As described above, according to the statistical multiplex system of the present embodiment, the bit rate Rd to be assigned to the information encoder 4 is set with priority, and the assignment of the bit rates Ri to each of the image encoders 2i is performed based upon the bit rate Rd. As a result, in a case where the auxiliary data Sd that should be transmitted is relatively littler, that much more bit rates can be assigned to each of the image encoders 2i. Consequently, the assignment of the bit rates without waste can be performed, being able to contribute to the improvement of the image quality.

Additionally, the data transmission commander 65 is made to control the output of the information encoder 4 according to the data remaining condition of the FIFO memory 61 for information, so that the overflow of the FIFO memory 61 for information or the like can be prevented.

Figure 11:
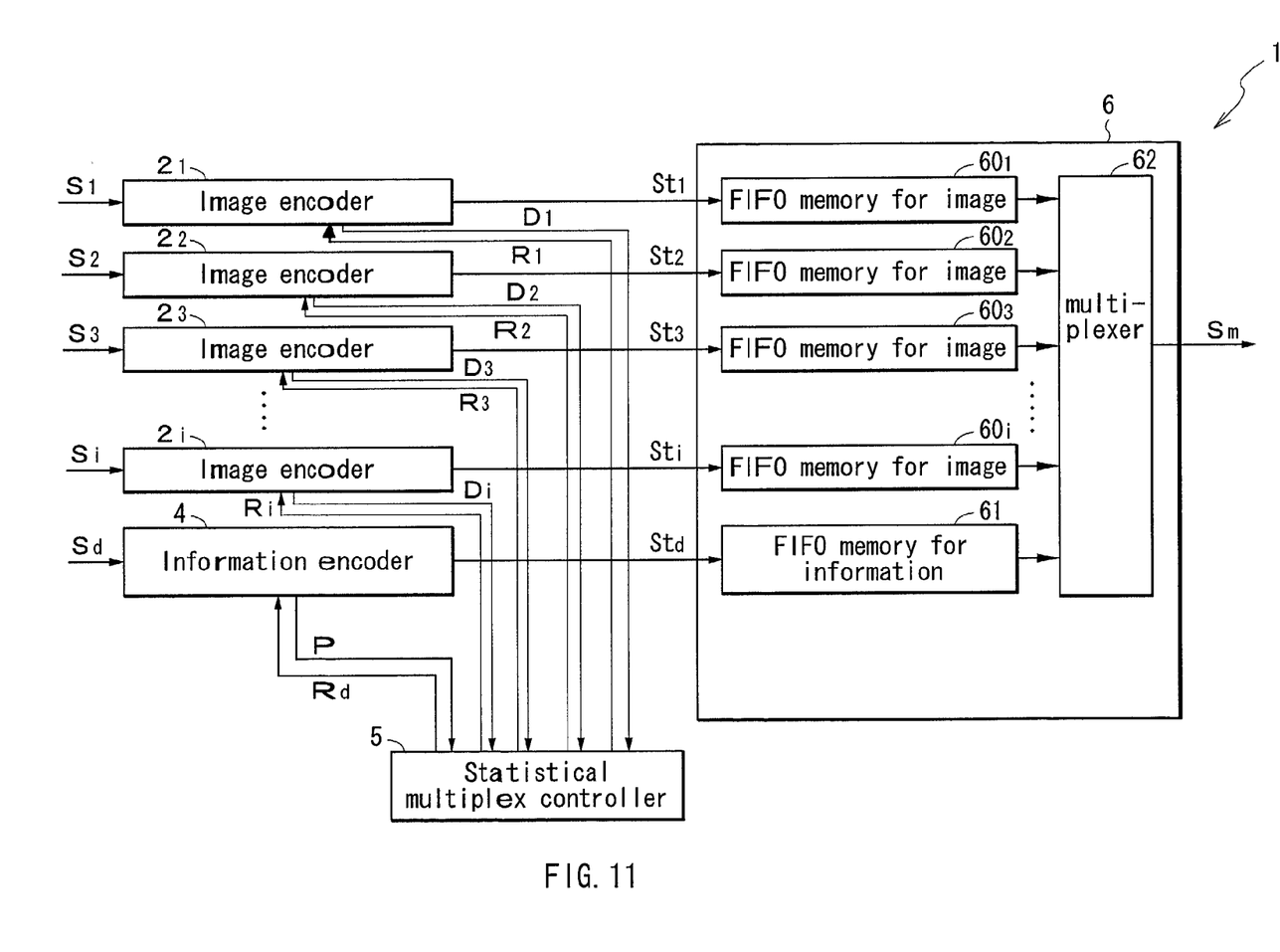
FIG. 11 is a block diagram showing another example of a structure of the statistical multiplex system.

Incidentally, although the data transmission commander 65 is made to control the information encoder 4 in the above-mentioned embodiment, the statistical multiplex controller 5 may be, as shown in FIG. 11, made to directly control the information encoder 4 without providing the data transmission commander 65. In such a configuration, processing time can be accelerated, so that more efficient encoding and transmission of information becomes possible.

While the present invention has been, up to this point, described with the embodiment given, the present invention is not limited to the above embodiment, and many variations are possible. For example, although the information encoder 4 is sole in the above embodiment, two or more information encoders may be provided. Furthermore, the encoder 42 in the information encoder 4 may convert the auxiliary data Sd into a transport stream so as to output the auxiliary data Sd.

Furthermore although the statistical multiplex controller 5 and the data transmission commander 65 are set to carry out the processes shown in FIGS. 9 and 10, other devices may be set to carry out the processes. Furthermore, the image encoders 2i, the statistical multiplex controller 5, the information encoder 4 and the multiplexing apparatus 6 may have different configurations from the configurations illustrated in FIGS. 4 to 7. Moreover, the auxiliary data to be encoded by the information encoder 4 is not limited to the EPG or the Internet information, and may be other data.

As described above, according to the statistical multiplex system of the invention, the statistical multiplex controller of the invention, and the method of statistical multiplex of the invention, after setting the code rate for the information encoding means, the code rates for the image encoding means are set based upon the code rate for the information encoding means. As a result, in a case where the auxiliary data that should be transmitted is littler, that much more code rates can be assigned to the program data. Consequently, the assignment of the code rates can be performed efficiently, being able to improve the image quality.

Especially, according to the statistical multiplex system of one aspect of the invention, the statistical multiplex controller of one aspect of the invention, and the method of statistical multiplex of one aspect of the invention, the statistical multiplex control means determines an image reference value by subtracting the code rate for the information encoding means from a gross code rate permissible, and assigns the code rates to each of the image encoding means within a limit of the image reference value. Consequently, without causing the overflow of the transmission channel or the like, the assignment of the code rates to the image encoding means can be performed efficiently.

Additionally, according to the statistical multiplex system of another aspect of the invention, the statistical multiplex controller of another aspect of the invention, and the method of statistical multiplex of another aspect of the invention, temporary code rates are set for each of the image encoding means, and the temporary code rates are revised so that the sum of the temporary code rates comes close to the image reference value. Consequently, within the limit of the reference value for image, the assignment of the code rates can be performed without waste.

Moreover, according to the statistical multiplex system of still another aspect of the invention, the code rate to be outputted by the information encoding means is made to be determined based upon the data remaining condition of the memory. Consequently, the overflow of the memory or the like can be prevented.

Obviously many modifications and variations of the present invention are possible in the light of the above teachings. It is therefore to be understood that within the scope of the appended claims the invention may be practiced otherwise than as specifically described.

What is claimed is:

1. A statistical multiplex system, comprising:
   a plurality of image encoding means for encoding a plurality of program data, each of which includes image data, and outputting the resultant;
   at least one information encoding means for
      acquiring an information encoding rate, encoding auxiliary data other than the program data,
determining a target encoding rate for said auxiliary data, and
outputting the resulting encoded auxiliary data;
means for determining data remaining condition information regarding said encoded auxiliary data;
data transmission command means for
acquiring said target encoding rate,
acquiring said data remaining condition information, and
determining said information encoding rate on the basis of said target encoding rate and said data remaining condition information;
multiplex means for multiplexing output data of each of the image encoding means and the at least one information encoding means; and
statistical multiplex control means for
setting a respective image code rate for each image encoding means, the image code rate representing an amount of codes to be outputted per unit time,
acquiring an encoding difficulty level which indicates a level of difficulty in encoding for each program data, and
assigning the respective image code rate to each of the image encoding means on the basis of the information encoding rate for the at least one information encoding means and the encoding difficulty level.

2. A statistical multiplex system according to claim 1, wherein the statistical multiplex control means
determines an image reference value by subtracting the information encoding rate for the at least one information encoding means from a gross code rate permissible, and
assigns the respective image code rates to each of the image encoding means within a limit of the image reference value.

3. A statistical multiplex system according to claim 2, wherein the statistical multiplex control means
sets temporary code rates, which are temporary target values of the respective image code rates, for each of the image encoding means on the basis of the encoding difficulty levels, and
revises the temporary code rates so that the sum of the temporary code rates comes close to the image reference value within the limit thereof, thereby assigns the respective image code rates to each of the image encoding means.

4. A statistical multiplex system according to claim 1, wherein the statistical multiplex control means comprises:
a memory for temporarily storing the output data from the at least one information encoding means and thereafter outputting the data to the multiplex means, and for outputting said data remaining condition information.

5. A statistical multiplex controller used for a statistical multiplex system which includes
a plurality of image encoding means for encoding a plurality of program data, each of which includes image data, and outputting the resultant;
at least one information encoding means for
acquiring an information encoding rate,
encoding auxiliary data other than the program data,
determining a target encoding rate for said auxiliary data, and
outputting the resulting encoded auxiliary data;
means for determining data remaining condition information regarding said encoded auxiliary data;
data transmission command means for
acquiring said target encoding rate,
acquiring said data remaining condition information, and
determining said information encoding rate on the basis of said target encoding rate and said data remaining condition information; and
multiplex means for multiplexing output data of each of the image encoding means and the at least one information encoding means, comprising:
means for setting a respective image code rate for each image encoding means, the image code rate representing an amount of codes to be outputted per unit time;
means for acquiring an encoding difficulty level which indicates a level of difficulty in encoding for each program data; and
means for assigning the respective image code rates to each of the image encoding means on the basis of the information encoding rate for the at least one information encoding means and the encoding difficulty level.

6. A statistical multiplex controller according to claim 5, wherein the means for assigning
determines an image reference value by subtracting the information encoding rate from a gross code rate permissible, and
assigns the respective image code rates to each of the image encoding means within a limit of the image reference value.

7. A statistical multiplex controller according to claim 6, wherein the means for assigning
sets temporary code rates, which are temporary target values of the respective image code rates, for each of the image encoding means on the basis of the encoding difficulty levels, and
revises the temporary code rates so that the sum of the temporary code rates comes close to the image reference value within the limit thereof, thereby assigns the respective image code rates to each of the image encoding means.

8. A statistical multiplex controller used for a statistical multiplex system which includes
at least one information encoding means for
acquiring an information encoding rate,
encoding auxiliary data other than the program data,
determining a target encoding rate for said auxiliary data, and
outputting the resulting encoded auxiliary data;
means for determining data remaining condition information regarding said encoded auxiliary data;
data transmission command means for
acquiring said target encoding rate,
acquiring said data remaining condition information, and
determining said information encoding rate on the basis of said target encoding rate and said data remaining condition information; and
multiplex means for multiplexing output data of each of the image encoding means and the at least one information encoding means, comprising:
means for setting a respective image code rate for each image encoding means, the image code rate representing an amount of codes to be outputted per unit time;

means for acquiring an encoding difficulty level which indicates a level of difficulty in encoding for each program data; and means for assigning the respective image code rates to each of the image encoding means on the basis of the information encoding rate for the at least one information encoding means and the encoding difficulty level.

9. A statistical multiplex system, comprising:

a plurality of image encoding means to encode a plurality of program data and output a respective encoding difficulty level for each program data, the difficulty level being an indicator of the difficulty in encoding for each program data;

at least one information encoding means to encode auxiliary data, which is other than program data, based on an information encoding rate and to output a target encoding rate for said auxiliary data;

means for determining data remaining condition information regarding the encoded auxiliary data and to determine the information encoding rate based on the target encoding rate and the data remaining condition information;

means for multiplexing the encoded program data and the encoded auxiliary data; and statistical multiplex control means to provide a respective image code rate for each image encoding means based on the information encoding rate and the encoding difficulty level, the image code rate representing an amount of codes to be outputted per unit time.

10. A method of statistical multiplexing comprising:

encoding using image encoders a plurality of program data based on a respective image code rate, each respective image code rate determined from an information encoding rate and an encoding difficulty level, the image code rate representing an amount of codes to be outputted per unit time;

determining a target encoding rate for auxiliary data, the auxiliary data comprising data other than program data;

encoding the auxiliary data based on the information encoding rate, the information encoding rate determined from the target encoding rate and data remaining condition information regarding the encoded auxiliary data; and multiplexing the encoded program data and the encoded auxiliary data, wherein the difficulty level is an indicator of the difficulty in encoding for each program data.

11. A method of statistical multiplex according to claim 10, wherein the determining each respective image code rate comprises:

determining an image reference value by subtracting the information encoding rate from a gross code rate permissible; and assigning the respective image code rates to each of the image encoders within a limit of the image reference value.

12. A method of statistical multiplex according to claim 11, wherein assigning the respective image code rate further comprises:

setting temporary code rates, which are temporary target values of the respective image code rates on the basis of the encoding difficulty levels; and revising the temporary code rates so that the sum of the temporary code rates comes close to the image reference value within the limit thereof, thereby assignment of the respective image code rates to each of the program data is performed.

* * * * *